(12) United States Patent
Todorovic et al.

(10) Patent No.: US 12,284,211 B2
(45) Date of Patent: Apr. 22, 2025

(54) CYBER CLONE OF A COMPUTING ENTITY

(71) Applicant: ADVANCED SECURITY TECHNOLOGIES ASIA PTE. LTD., Chinatown Point (SG)

(72) Inventors: Vladan Todorovic, Nis (RS); Danijel Sokolovic, Pirot (RS)

(73) Assignee: ADVANCED SECURITY TECHNOLOGIES ASIA PTE. LTD., Chinatown Point (SG)

( * ) Notice: Subject to any disclaimer, the term of this patent is extended or adjusted under 35 U.S.C. 154(b) by 330 days.

(21) Appl. No.: 18/163,772

(22) Filed: Feb. 2, 2023

(65) Prior Publication Data

US 2024/0267409 A1 Aug. 8, 2024

(51) Int. Cl.
*H04L 9/40* (2022.01)

(52) U.S. Cl.
CPC .......... *H04L 63/1483* (2013.01); *H04L 63/02* (2013.01)

(58) Field of Classification Search
CPC .................................. H04L 63/1491
See application file for complete search history.

(56) References Cited

U.S. PATENT DOCUMENTS

| | | | |
|---|---|---|---|
| 7,206,862 B2 * | 4/2007 | Wheeler | H04L 63/1466 709/217 |
| 8,813,228 B2 | 8/2014 | Magee et al. | |
| 9,742,804 B2 * | 8/2017 | Urias | G06F 21/53 |
| 10,491,628 B2 * | 11/2019 | Kawauchi | G06F 21/566 |
| 10,986,126 B2 | 4/2021 | Luo et al. | |
| 11,057,429 B1 * | 7/2021 | Sellers | G06F 16/27 |
| 11,290,486 B1 * | 3/2022 | Allen | H04L 63/1416 |
| 2006/0137012 A1 * | 6/2006 | Aaron | H04L 63/1408 726/24 |
| 2008/0109870 A1 * | 5/2008 | Sherlock | H04L 63/1425 726/1 |
| 2017/0126736 A1 * | 5/2017 | Urias | H04L 63/1491 |
| 2018/0124069 A1 * | 5/2018 | Ettema | H04L 63/1416 |
| 2018/0302438 A1 * | 10/2018 | Robertson | H04L 63/20 |
| 2018/0375897 A1 * | 12/2018 | Kawasaki | H04L 63/1491 |
| 2019/0081980 A1 * | 3/2019 | Luo | G06N 20/00 |

(Continued)

FOREIGN PATENT DOCUMENTS

| | | |
|---|---|---|
| CN | 114157498 A | 3/2022 |
| WO | 20210046094 A1 | 11/2021 |

OTHER PUBLICATIONS

EP 24152594.8—Extended European Search Report, mailed Apr. 19, 2024, 9 pages.

(Continued)

*Primary Examiner* — Khang Do
(74) *Attorney, Agent, or Firm* — Newport IP, LLC; Jacob P. Rohwer

(57) ABSTRACT

A cyber clone of a computing entity stores a request received at the computing entity and a response sent from the computing entity. An external request from an attacker is compared with the recorded request. In response to a match the associated recorded response is sent to the attacker. In response to the external request not matching the recorded request, a false, deceiving response is provided. Alternatively the external request is forwarded to the computing entity, and a live response is forwarded to the attacker. The external request and live response for the current state are optionally stored.

20 Claims, 7 Drawing Sheets

(56) References Cited

U.S. PATENT DOCUMENTS

| | | | |
|---|---|---|---|
| 2019/0116136 A1* | 4/2019 | Baudart | H04L 63/1491 |
| 2020/0053121 A1* | 2/2020 | Wilcox | G06F 40/205 |
| 2020/0220875 A1* | 7/2020 | Harguindeguy | H04L 63/101 |
| 2021/0067553 A1* | 3/2021 | Ries | H04L 63/0263 |
| 2021/0194926 A1* | 6/2021 | Luo | H04W 4/70 |
| 2021/0377307 A1* | 12/2021 | Santana De Oliveira | G06F 18/217 |

OTHER PUBLICATIONS

Nikola Stevanovic, et al., "Web Attack Detection Based on Traps", Springer, Dec. 3, 2021, 25 pages.

* cited by examiner

CYBER CLONE OF A COMPUTING ENTITY

The present disclosure relates to cyber security and more specifically to the use of a cyber clone of a computing entity.

BACKGROUND

Every system with an internet connection is somewhat vulnerable to security attacks. With new technologies these attacks are constantly changing, and it is highly challenging to detect unknown zero-day attacks. Computer networks are an indispensable part of acquiring and sharing data and information, with the Internet being the biggest and most influential external network. Billions of systems serve users over the Internet, and many of those systems are targeted by cybercriminals with the goal of discovering vulnerabilities in systems to solicit illegal profit or carry out malicious activities.

Existing cyber-attack detection solutions are mostly signature-based. They work on the principle of creating predefined patterns, and later looking for them in the requests sent to the system. These patterns can be specific sequences of words or bytes in the network flow, or even complete requests sent to the server. This approach is good at detecting already known attacks, but requires human intervention to collect attack data, analyse it and define detection signatures.

This human intervention for detecting and analysing attacks requires considerable cost and crucially time, which leads to significant delays between hackers deploying zero-day attacks and their detection and prevention.

The examples described herein are not limited to examples which solve problems mentioned in this background section.

SUMMARY

Examples of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cyber clone of a computing entity is provided comprising a processor and a memory. The memory storing instructions that cause the cyber clone to store a plurality of states, each state corresponding to a distinct operating state of the computing entity. Then to store for each state in the plurality of states a recorded request received at the computing entity in a corresponding operating state, and a recorded response sent from the computing entity and associated with the recorded request.

The cyber clone receives an external request from an attacker. Determines indicators of attack from the external request. Compares the external request with the recorded request for a current state of the plurality of states. Then in response to the external request matching the recorded request, the cyber clone sends the associated recorded response to the attacker.

Providing the attacker with recorded responses when the external request matches a stored request for a stored state increases the deceptiveness of the cyber clone from the point of view of the attacker because it ensures the response is the same as that expected from the genuine computing entity.

In response to the external request not matching the recorded request the cyber clone provides a false, deceiving response, or forwards the external request to the computing entity, receives a live response from the computing entity, forwards the live response to the attacker, and optionally stores the external request and live response for the current state. The cyber clone updates the current state to a state of the plurality of states based on the external request and the current state.

Providing the attacker with a deceiving or live response when the external request does not match a stored request increases the deceptiveness of the cyber clone. It ensures the interaction with the attacker can continue even where no recorded response is applicable because an irregular request was made.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

Figure 1:
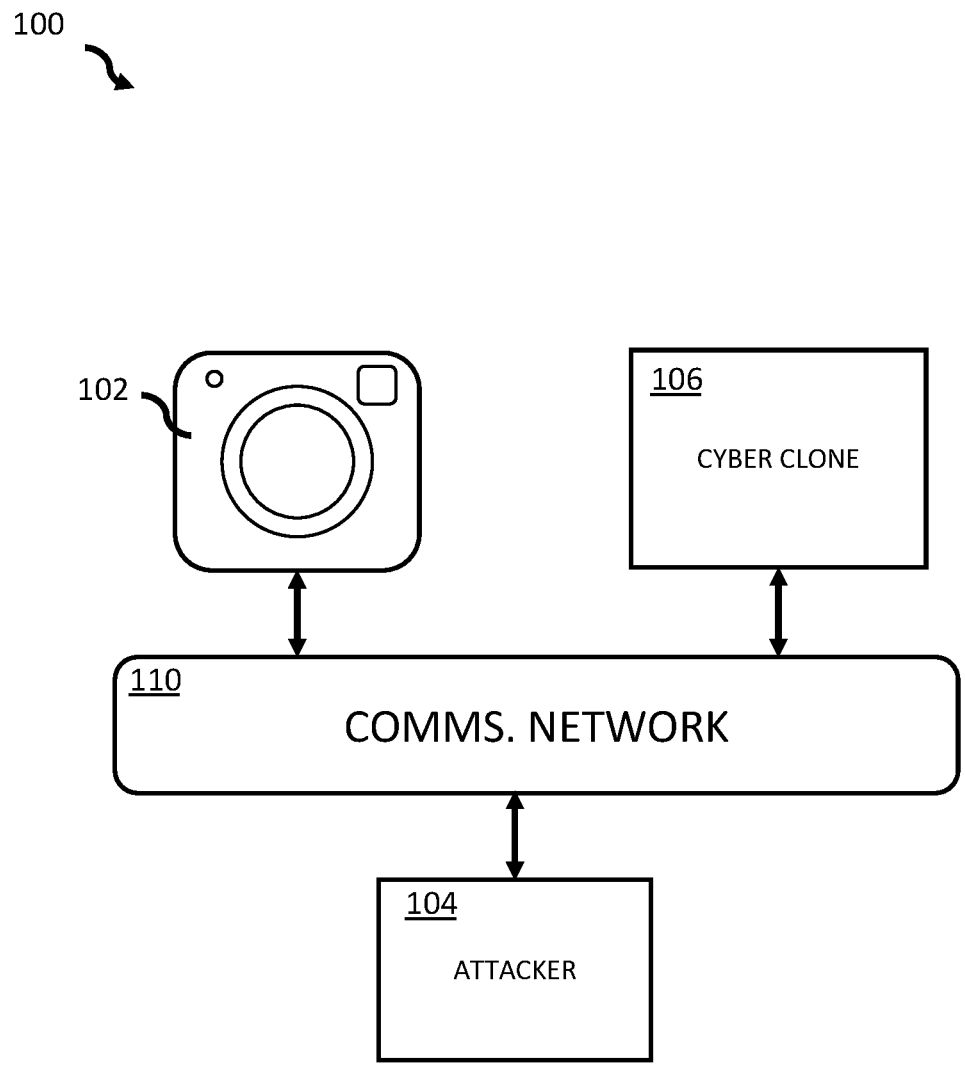
FIG. 1 illustrates an example application of a cyber clone.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

FIG. 1 of the accompanying drawings shows a scenario 100 comprising a computing entity 102 illustrated as an Internet Protocol (IP) camera, an attacker 104 and a cyber clone 106. While an IP camera is shown in the scenario 100, in practice the computing entity 102 is any networked device, online service or Internet of Things (IoT) device. The computing entity 102, cyber clone 106 and attacker 104 are each connected to a communications network 110. The communications network 110 is any network able to connect external computing entities to the IP camera 102 and the cyber clone 106, such as internet, intranet, extranet or point-to-point network. The communications network 110 comprises any known wired or wireless network hardware capable of connecting external computing entities to the IP camera 102 and the cyber clone 106.

The computing entity 102 comprises a network interface that allows users to establish a connection. In the case of an IP camera 102 the connection is used to download images. To access the computing entity 102 there may be an authentication or other security process required. Unauthorised users such as attacker 104 attempt to establish a connection with networked devices such as the computing entity 102 for malicious purposes. A security system of the computing entity 102 is able to take action to stop the attacker 104 when an indicator of attack is recognized, or a known vulnerability is being exploited. In many cases the attacker 104 is taking advantage of an unknown, or zero-day, vulnerability in devices that the in-built security of the computing entity 102 cannot recognize and rectify in a timely manner.

To prevent this, it is desirable to analyse the vectors of attack used on computing entities, such as IP cameras without exposing the device itself. The cyber clone 106 includes a memory that stores responses to mimic the computing entity 102. The cyber clone 106 is a hardware and/or software level emulator of a specific device or a system based on request-response relevant protocol. During any communication session the computing entity 102 receives requests and replies by sending one of a range of possible responses. Responses include approval or denial of access, error messages, or any other response. The responses are selected based on the request received and an operating state of the computing entity 102. There are a finite number of states with a finite number of responses available for the computing entity 102, meaning the states can be cloned in a state machine that provides any expected response. The state machine is generated and used by the cyber clone 106 to mimic the request-response interactions between the attacker 104 and the computing entity 102. This state machine is stored in the memory of the cyber clone 106. Storing the states in this manner means the cyber clone 106 is a universal model that can be applied to clone any information technology IT, IoT or any other computing system or service from the point of view of an attacker.

The cyber clone 106 provides a discoverable network interface on the communications network 110, for the attacker 104 to discover and begin sending requests. When seeking to observe targeted attacks specifically aimed at the computing entity 102 the cyber clone 106 is placed in a network segment, location or IP address related to a target organisation of the computing entity, either by ownership of IP or by reverse domain name system (DNS) records. Attacks performed against the cyber clone 106 at this specific network segment, but not at other network segments, indicate a targeted attack. Otherwise, the cyber clone 106 is located anywhere on the communications network 110 to detect untargeted or loosely targeted attacks.

Upon receiving a request from the attacker 104 the cyber clone 106 refers to the state machine in memory to provide a same recorded response the attacker 104 would expect from the genuine computing entity 102. By responding to the requests using a full range of responses collected from the specific computing entity 102 in all its operating states the cyber clone makes sure the attacker 104 cannot recognize they are interacting with the cyber clone 106. The deception prolongs the interaction and allows extensive collection of information identifying the attacker and indicators of attack. In some cases, receiving the convincing response from the cyber clone 106 will cause the attacker to send further requests that provide more detailed information on their identity and indicators of attack.

Figure 2:
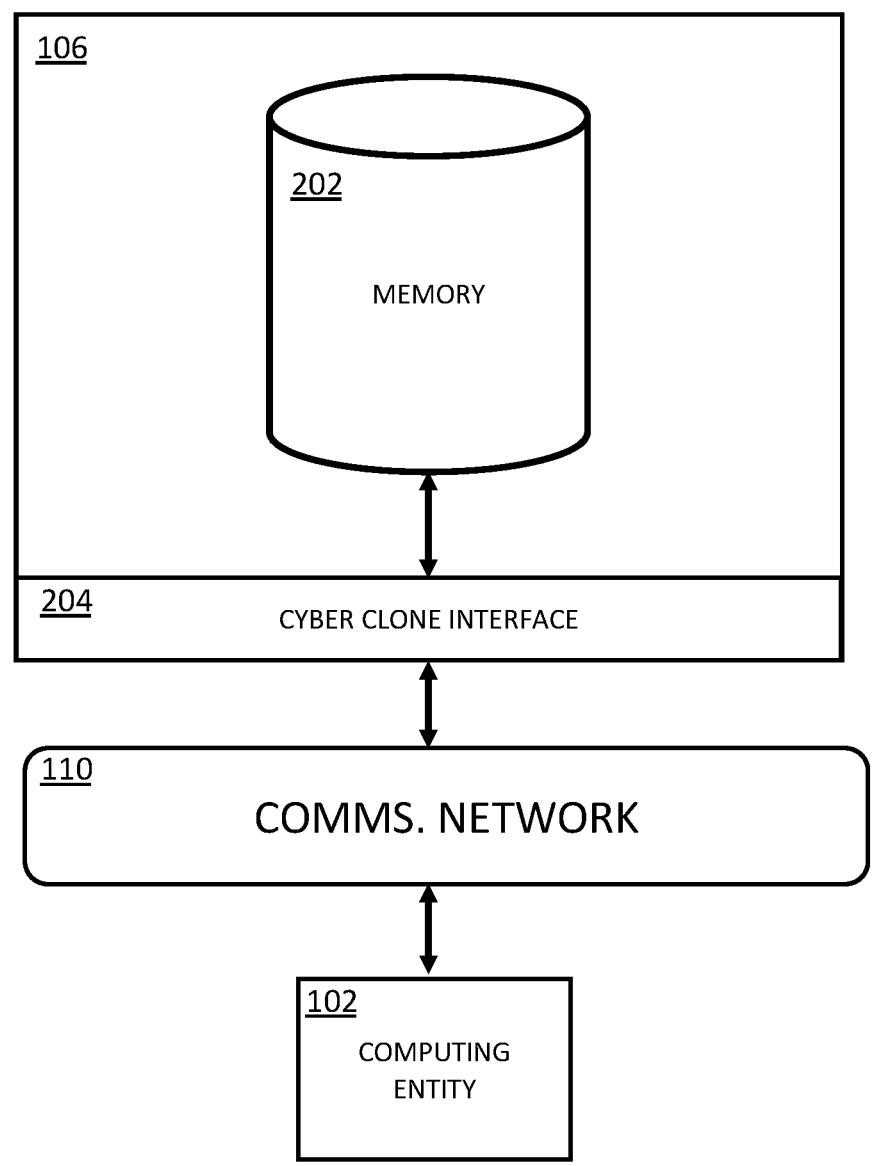
FIG. 2 illustrates schematically a cyber clone and a computing entity.

FIG. 2 of the accompanying diagrams shows a system 200 comprising the cyber clone 106 and computing entity 102. The cyber clone is further illustrated showing a memory 202 and a cyber clone interface 204. To deceive attackers the cyber clone 106 populates the memory 202 with all operating states of the computing entity 102. This causes the cyber clone to be indistinguishable from the original computing entity for standard attack reconnaissance tools, such as network and vulnerability scanners (e.g. Nmap (trademark), Angry IP scanner (trademark), Nessus (trademark), Qualys (trademark), Acunetix (trademark), or OpenVAS (trademark)) and reconnaissance services (e.g. Shodan (trademark), Censys (trademark), ZoomEye (trademark), or BinaryEdge (trademark)).

Each operating state of the computing entity comprises one or more expected requests arriving at the computing entity 102 and associated responses sent in reply. The responses sent by the computing entity 102 therefore depend on the request received and the current state of the computing entity 102, these are represented in the state machine in the cyber clone 106 memory 202.

To populate the state machine in the memory 202 the cyber clone 106 records live requests and responses at the computing entity 102. The cyber clone 106 is connected to the computing entity 102 through the cyber clone interface 204 and the communications network. While a single hop is shown, in practice any number of network devices such as routers and/or switches might operate between the cyber clone 106 and the computing entity 102. The cyber clone interface 204 is any application or network layer interface such as an application programming interface (API), ethernet, Wi-Fi, optical or any other that can facilitate a connection to the computing entity 102. Interface in this description refers to any Industrial IoT device or information technology IT system interface. The interface is a shared boundary across which two or more separate components of a computer system exchange information. An interface can be exploited for cyber-attacks. Typically regular communication occurs over an interface with systems or users.

The cyber clone 106 observes and records the requests and responses sent to and from the computing entity 102 for each operating state in use. Depending on the computing entity the requests and responses will include confidential, identifying, or security sensitive data. In some examples the cyber clone 106 sanitizes or anonymizes the requests and associated responses or performs any other form of customisation specified by an administrator before it is used.

To be a convincing cyber clone a sufficient range of requests and responses are available in the memory. The memory 202 is populated by recording requests and responses during regular use of a computing entity of the same specification. The requests and responses recorded from observation can be supplemented by the cyber clone 106 actively sending test requests to the computing entity 102 (similar to web crawling) and recording the live response sent from the computing entity 102 in reply.

Figure 3:
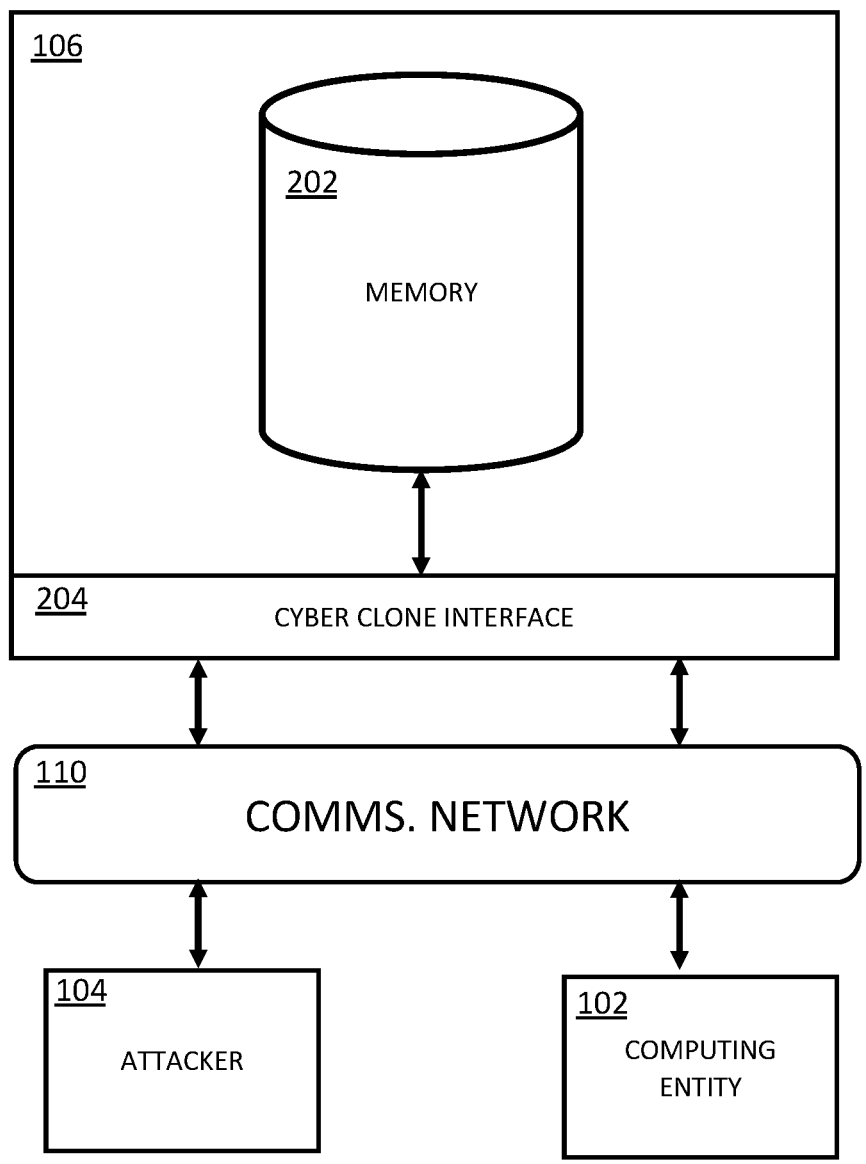
FIG. 3 illustrates schematically a cyber clone, computing entity and an attacker.

FIG. 3 of the accompanying diagrams illustrates the system 200 with the addition of an attacker 104. The attacker 104 is connected to the cyber clone 106 through the communications network 110. The attacker 104 is conducting a cyber-attack on the owners of the IP address of the cyber clone 106, this includes for example targeting IP addresses associated with a specific organization and/or an untargeted attack. The attacker 104 is either a human cyber-attacker or an automated cyber-attacker. During a cyber-attack one or more irregular requests are sent to computing entities through the communications network 110 for reconnaissance, to gain access, or for any other malicious purpose. The attacker 104 can recognize legitimate responses from networked devices that indicate an attack is possible. Where the responses are different to those expected or there are ignored requests, the attacker 104 can recognize the abnormal behaviour as a trap or other security system operating at the IP address. In such a case they are likely to suspend the attack and the chance to learn more about the indicators of attack and attacker 104 is lost.

As detailed above the cyber clone comprises a state machine in the memory 202 which comprises request-response pairs for a plurality of states corresponding to the operating states of the computing entity 102. The cyber clone 106 uses the state machine in the memory 202 to select a convincing response to the request sent from the attacker 104 for a current state. To achieve this, the external request from the attacker 104 is compared to the recorded requests in the memory 202 associated with a current state of the cyber clone 106. When there is a matching recorded request, the associated recorded response is sent to the attacker 104. Using responses recorded from the specific computing entity 102 and for states corresponding to the operating states of the specific computing entity 102 makes it possible to deceive the attacker 104 into continuing the communication and sending further requests to the cyber clone 106.

With each request certain indicators of attack associated with the request are extracted and stored at the cyber clone 106 and optionally associated with the attacker 104. The indicators of attack comprise data extracted from the request that can be used for one or more of: to provide identifying information on the attacker 104, to provide information on the indicators of attack, to provide information on any selected vulnerability, to determine whether the attack is targeted or untargeted, to determine whether the attack is an unknown zero-day attack. How these are determined is discussed in further detail below. Examples of data extracted as indicators of attack include Internet Protocol (IP) addresses, classless inter-domain routings CIDRs, Uniform Resource Locators (URLs), domain names, payloads, signatures, hash values, keywords, and email addresses. In some examples the stored indicators of attack are sent to a central server for processing and distribution to other computing entities, firewalls etc. Sharing the indicators of attack stored at the cyber clone 106 improves the security of the devices/systems by in effect providing a group vaccine against the same cyber-attack allowing crowd immunity for the other devices/systems having the shared indicators, while exposing only the cyber clone 106 which is a non-sensitive device.

Initially the state machine in the memory 202 comprises the recorded requests and their associated responses at the computing entity 102, as discussed above. However, when carrying out an unknown and/or zero-day attack the attacker 104 will send irregular requests that have not been observed at the computing entity 102 before. Accordingly, there will be no matching response to the request stored in the relevant state in the memory 202 for the cyber clone 106 to send in reply. Simply not responding to the irregular request would increase the likelihood of ending the interaction with the attacker 104 and losing the chance of gathering further indicators of attack. Instead, the cyber clone 106 retrieves a live response by forwarding the external request to the computing entity 102. In some examples to provide further security this response retrieval is performed using a reverse proxy connection between the computing entity 102 and the cyber clone 106.

There are three types of recorded responses possible for the stored states. The first is a fixed value response which sends a fixed value stored in the memory 202 to the attacker 104. The fixed value response can be any fixed value for example text, a Hyper Text Transfer Protocol (HTTP) page, or a number. The second is a dynamic value response which sends a value dynamically generated by the cyber clone 106. The response stored in the memory 202 specifies the type of dynamic response value and the cyber clone 106 generates a typical value. The typical value is generated using any one or more of: rules, a pseudo random number generator, a default value, interpolation, a function that creates a dynamic value based on parameters, or in other ways. Non-limiting examples of dynamic value sent are a temperature value, a camera view, or a screenshot. The third recorded response type is a simulated error response. The simulated error response stored with the state in memory lists the type of simulated error and the cyber clone 106 generates a specific response based on the attacker request. Examples of simulated error responses include a fake error page, a fake time out or a fake data output. One example is a fake database data output that shows the attacker 104 deceptively that they have successfully executed code on the cyber clone 108.

Figure 4:
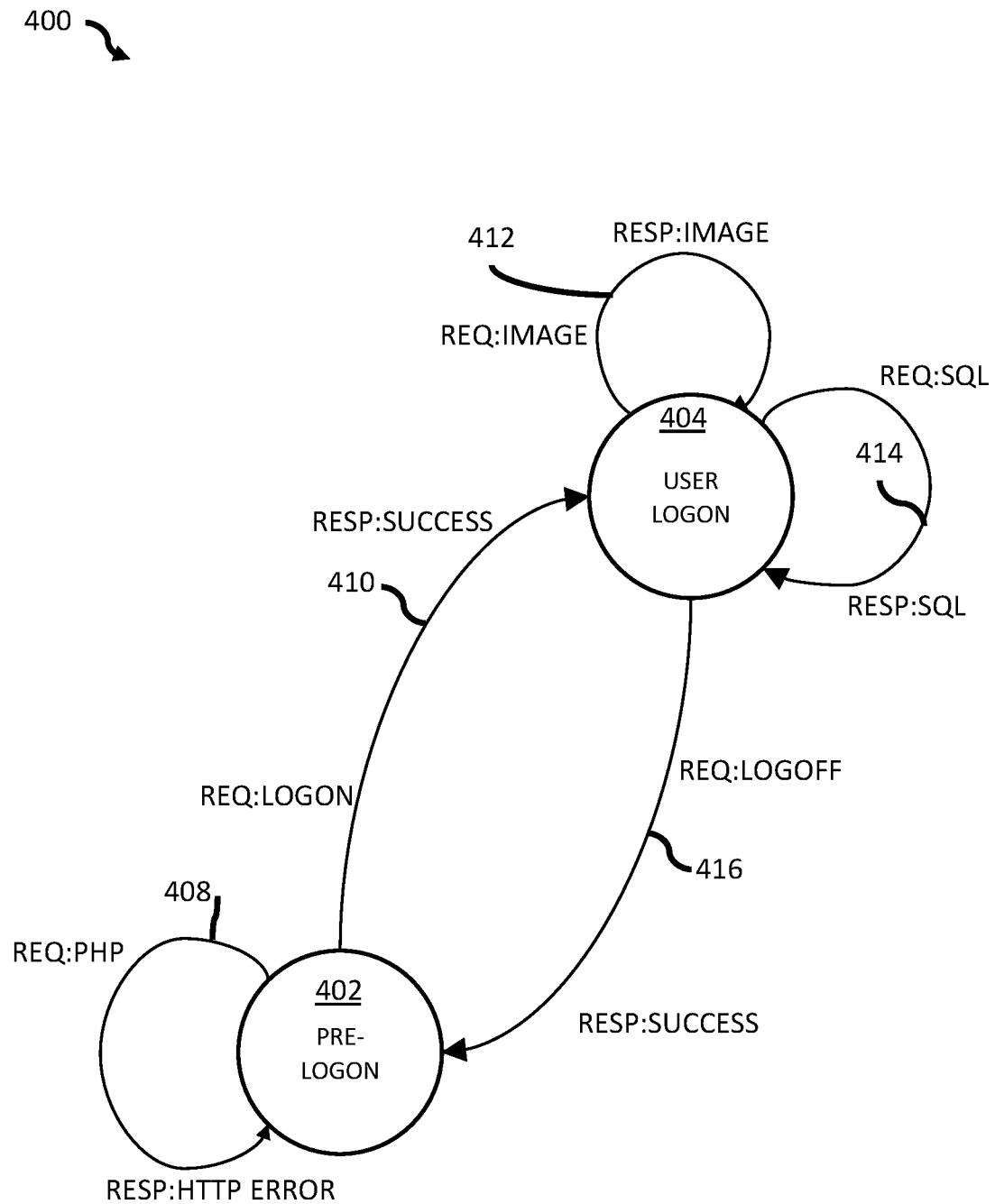
FIG. 4 is a flow diagram illustrating a plurality of states of a cyber clone.

FIG. 4 of the accompanying diagrams illustrates a state machine 400 that is an example state machine that is stored in the memory 202 of the cyber clone 106. The state machine 400 comprises two states, a pre-logon state 402 and a user logon state 404. The states stored in the memory 202 of the cyber clone 106 correspond to internal operating states of a computing entity 102. In this example the computing entity is an IP camera and therefore the states stored in the memory 202 correspond to internal operating states of an IP camera. The pre-logon state 402 is where no user has authenticated and access to the images is denied. The user logon state 404 is where the user has authenticated and access to images is granted. The stored states in the cyber clone 106 determine the responses sent by the cyber clone 106 for different received requests. While two states are shown in state machine 400, in practice there can be any number of states in the memory 202. The state machine 400 includes state transitions that are triggered by receiving certain requests while occupying the current state. The state transitions also illustrate the request and the associated response sent in reply for their starting state. The states, request-responses and state transitions stored in the memory 202 of the cyber clone 106 will be different for every computing device cloned.

Starting in the pre-logon state 402 there are two possible state transitions from this state indicating there are two recorded requests and associated responses stored in the cyber clone 106. A first state transition 408 is stored for a hypertext preprocessor (PHP) request when in the pre-logon state 402. The recorded response is a HTTP error response, which is an example of a simulated error response. The state transition 408 returns to the pre-logon state 402 because there was no successful logon request received.

The second state transition 410 is triggered by a successful logon request when in the pre-logon state 402. In the example of the state machine 400 this is a fixed value response recorded in the memory from generally continuous observation of the network traffic at the computing entity 102 or from live responses to test requests from the cyber clone 106. The recorded response for the logon request in the pre-logon state 402 is a logon success message. Responding with this authentic response taken from the computing entity 102 leads to continued communication with the attacker 104, because they receive the response expected from the genuine computing entity 102. The second state transition moves the state machine 400 to the user logon state 404. Transitioning states changes the requests and associated responses that would be expected and sent by the cyber clone 106.

The third state transition 412 is triggered by an image request when in the user logon state 404. An image response is recorded as the associated response for the image request in the user logon state. The image response is an example of a dynamic value response because the image is not stored with the state machine 400 in the memory 202 but generated dynamically by the cyber clone 106. Dynamically generating certain responses such as the image response of the IP camera avoids sending a genuine image or other confidential or sensitive information to an attacker 104.

The fourth state transition 414 is triggered by an SQL request when in the user logon state 404. The recorded response is a SQL error response; this is an example of a simulated error response. Unlike fixed responses the simulated error response is dynamically generated by the cyber clone. In this example the response is a fake SQL error response. When sent to the attacker 104 the fake SQL error message will deceptively show an automated or human attacker that they have attempted to execute code on the cyber clone 106. This has the advantage of encouraging continued interaction with the attacker 104 to gather more detailed indicators of attack.

When a request is received from the attacker while the state machine 400 is in either state and does not have a matching request then no stored response is available. In this case a response retrieval is performed to continue the interaction, by sending the request to the computing entity 102 and forwarding the live response to the attacker 104. During response retrieval the response is anonymized, sanitized, or otherwise customized to remove sensitive or identifying information.

Figure 5:
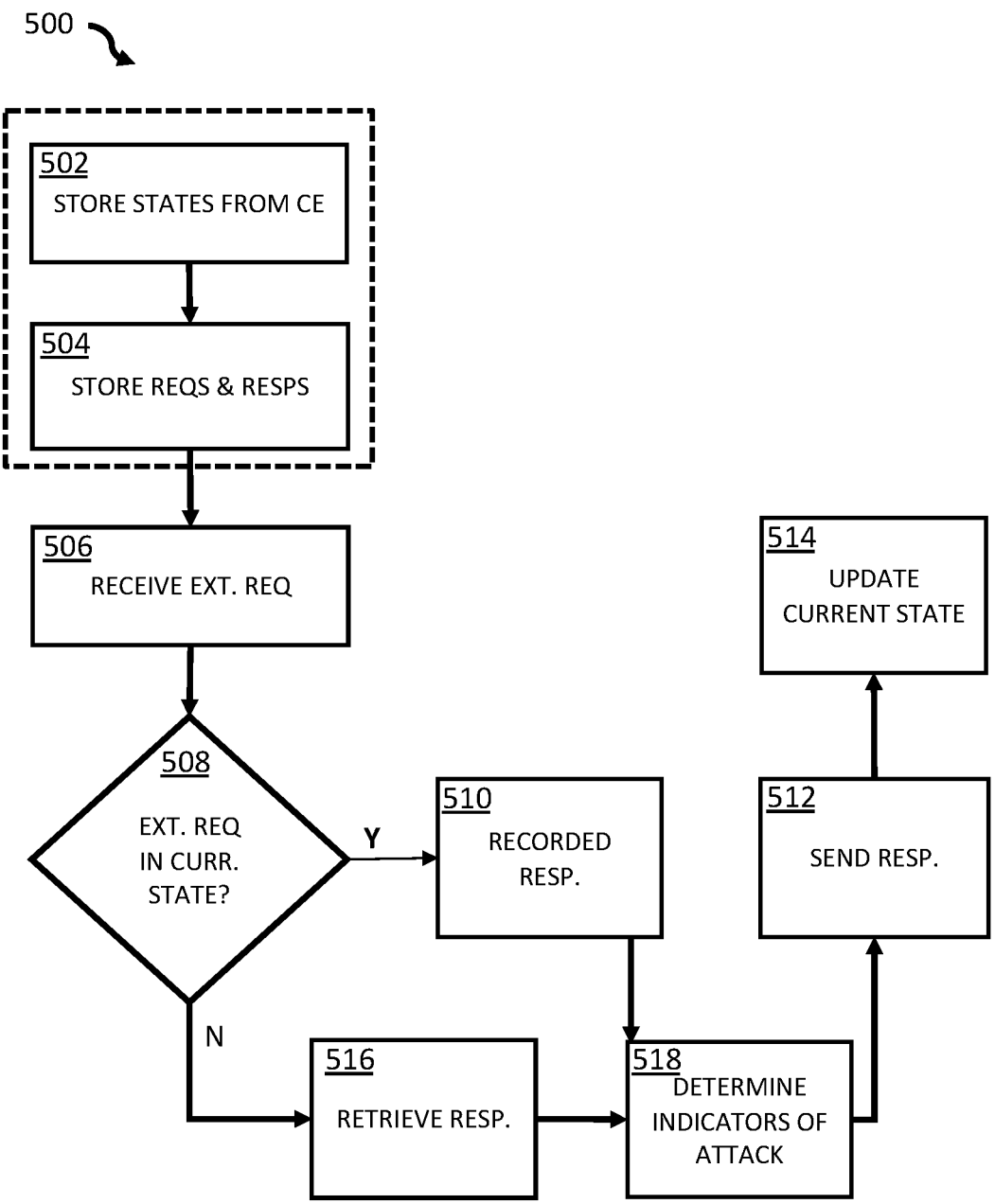
FIG. 5 is a flow diagram illustrating a method for deceiving an attacker with a cyber clone.

FIG. 5 of the accompanying diagrams illustrates a method 500 for deceiving an attacker using a cyber clone. Operations 502 and 504 of FIG. 5 are about the process of creating a clone and so are within a dotted box in FIG. 5. The other operations in FIG. 5 are performed by the clone after it has been created. In a first operation 502 the cyber clone stores states corresponding to the operating states of a computing entity in memory in the cyber clone. The states are stored as a state machine in the memory of the cyber clone. Retrieving the states from the computing entity involves the cyber clone communicating with the computing entity interface or listening to traffic at the interface over a period or continuously. Repeating requests over time and analysing variations allows distinguishing fixed and non-fixed components of a response. The use of operating states for a specific computing entity allows for a convincing cyber clone because it ensures the same responses are provided to an attacker as expected from the genuine computer entity.

In a second operation 504 the cyber clone stores requests and responses for each state in the memory. The requests and responses are collected through passive observation of the traffic at the computing entity. Additionally or alternatively the responses are actively investigated by sending test requests to the computing entity and recording the live responses. The requests and responses are stored associated with their corresponding state in the memory. The cyber clone keeps track of a current state to determine which requests and responses apply at a given time. Manual or automated sanitisation is part of this operation performed for the purpose of preventing disclosure of any confidential/ private data, and it will be replaced with false data or with a function for dynamic creation of response data.

In a third operation 506 an external request is received from an attacker. The external request is received as part of a cyber-attack that is targeted or untargeted. The cyber clone has an IP address that is discoverable allowing attackers trawling network interfaces to discover and send requests to the cyber clone. In an example the external request is received at a network interface of the cyber clone that does not have a DNS address. By having an IP address but not a DNS address the cyber clone interface is discoverable but the chances of a legitimate user attempting access is reduced, reducing the opportunity for false positives. Another example is the external request received at a network interface of the cyber clone that does have a deceiving DNS address (e.g., testserver) but which are not publicly advertised or exposed.

In a fourth step 508 the external request is compared to the recorded requests for the current state of the cyber clone. If the request type and payload match a stored request and payload or a relevant variation, the method progresses to the fifth step 510, otherwise the method moves on to the sixth step 516. In an example a relevant variation is where requests match except for a date of the requests. Searching for matches may be done using wildcards, so as to replace a date field (or other field) with a wildcard and search for requests which match except for the wildcard field. Relevant variations of a request are requests with the same request command parameter, while request data parameter(s) specific to the relevant request command are changeable and its range of values (variations) can be matched using a single regular expression.

In a fifth step 510 the recorded response associated with the recorded request that matches the external response is determined. In some examples the recorded response is a predetermined fixed or dynamic value and is available in the memory of the cyber clone. In other examples the recorded response is a dynamic value response where the type is specified but the response is generated by the cyber clone. Any dynamic value is envisaged, an example being a temperature value. In other examples the recorded response is a simulated error message for example a simulated time out response.

In a sixth step 516 the external request has not matched a recorded request and therefore a response retrieval is carried out by the cyber clone. This response can be a predetermined deceiving response or live device response, obtained by forwarding the external request to the computing entity and observing the response. This live response is then used by the cyber clone to reply to the external request. The response retrieval is in some examples carried out over a reverse proxy connection between the cyber clone and the computing entity.

In a seventh step 518 indicators of attack are determined from the external request in both branches exiting from decision point 508 since in both branches the request is from an attacker. Gathering indicators of attack at the cyber clone from the attacker allows the discovery of unknown and/or zero-day attacks that would have otherwise affected a genuine service or device. Any indicator of attack, for example an Internet Protocol (IP) addresses, CIDRs, Uniform Resource Locators (URLs), domain names, payloads, signatures, hash values, keywords, and email addresses, is determined from the external request. Where the cyber clone forms part of a crowd immunity system the indicators of attack are forwarded to a central server for correlation with indicators of attack from other cyber clones and historic indicators of attack, and distribution within a crowd immunity system.

In an eighth step 512 the recorded or retrieved response is sent to the attacker. In a ninth step 514 the current state of the cyber clone is updated to a new state based on the external request and the current state. In some examples such as in state transition 410 from FIG. 4 a received request when the cyber clone is in a state triggers a transition to a new state. In some examples such as in state transition 412 from FIG. 4 the received request does not trigger a change of current state.

In some examples the method of FIG. 5 is extended by extending the operations for creating the cyber clone. The stored responses may be modified to falsely indicate to a potential attacker that vulnerabilities are present. This allows the cyber clone to be configured to introduce vulnerabilities, without a negative security impact, to attract hackers to the cyber clone rather than the computing entities which have been cloned.

Figure 6:
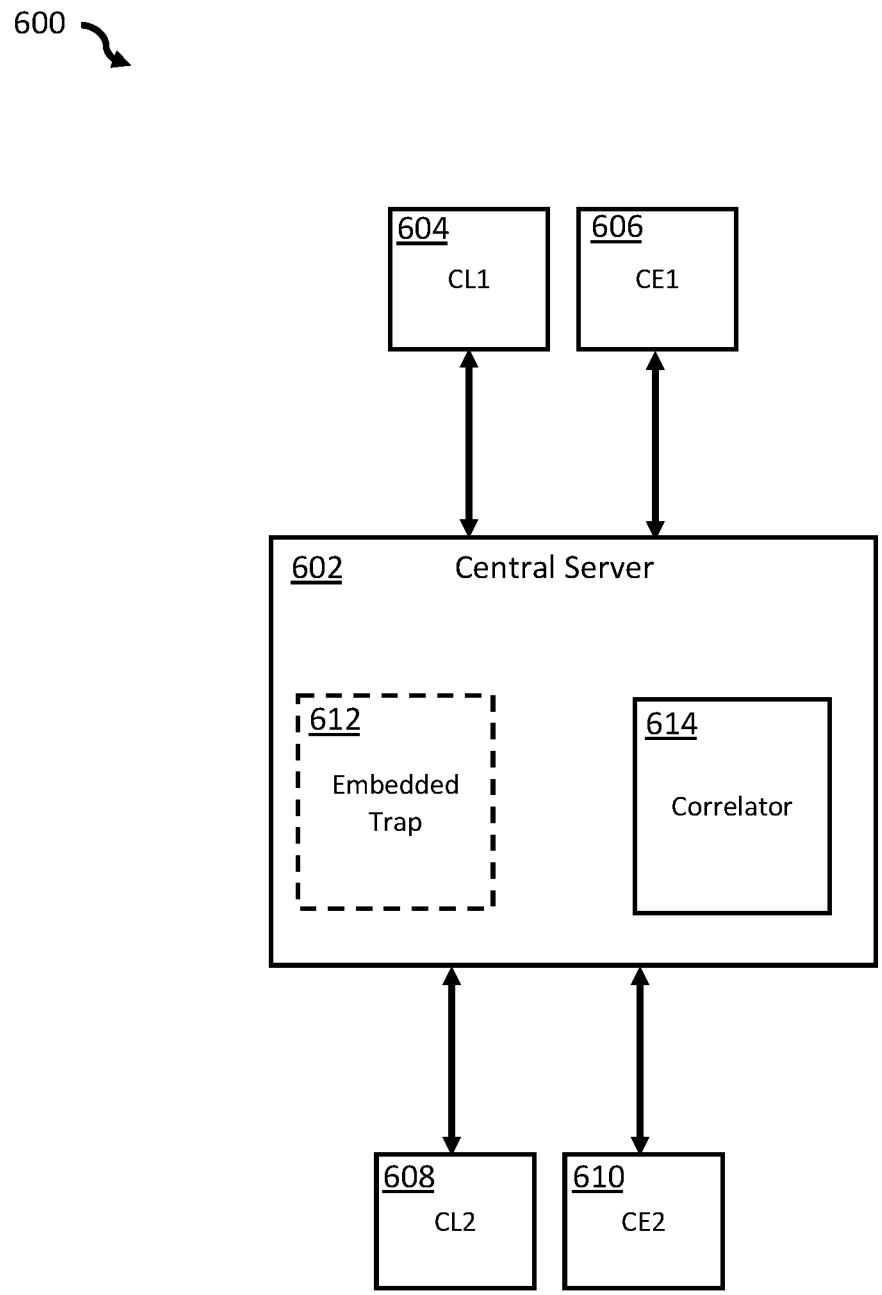
FIG. 6 is a schematic diagram illustrating a system with a plurality of cyber clones.

FIG. 6 of the accompanying diagrams illustrates a system for achieving crowd immunity from zero-day cyber-attacks. The system comprises a first cyber clone CL1 604 cloning a first computing entity CE1 606, a second cyber clone CL2 608 cloning a second computing entity CE2 610, all connected to a central server 602. The central server 602 comprises a correlator 614 and optionally an embedded trap 612. While only the connection to the central server 602 is shown, the cyber clones and computing entities are additionally connected to a communications network as shown in FIG. 3. While only two pairs of cyber clones and computing entities are shown in practice there are up to thousands of cyber clone and computing entity pairs.

CL1 and CL2 perform the same cloning and indicator attack gathering method for their respective CE1 and CE2 as described regarding any of FIGS. 1-5 above. In addition, in system 600 the central server retrieves the indicators of attack from the two or more cyber clones. Having access to indicators of attack gathered at multiple clones provides several opportunities for analysis of cyber-attacks on the system. A first opportunity is to determine whether indicators of attack gathered by a cyber clone are indicative of an unknown and/or zero-day attack. This is determined by performing real time correlation on the indicators of attack from the cyber clone with historic indicators of attack. In this application real time correlation is a process of analysing data streams obtained from cyber-clones in real time to detect patterns or relationships between those streams and historic data. It is based on correlation rules, that analyse and compare events data with relevant context, and perform complex analyses in real time for the purpose of identifying, aggregating, extracting, or enriching attack relevant information. The correlation is performed in real-time at the central server by the correlator 614. The correlator 614 is a software or hardware correlator or comprises both hardware and software elements. In some examples, the correlation is computed by computing a similarity metric between incoming data from cyber clones and historic data. Any similarity metric may be used. The historic indicators of attack are from local cyber clones or include indicators of attack from a plurality of networks. Where there is a high correlation, this indicates that the indicators of attack were present in previous cyber-attacks, and it is therefore unlikely that the cyber clone indicators of attack indicate an unknown and/or zero-day attack. Where there is a low correlation, it indicates there is a high likelihood of unknown and/or zero-day attack.

This analysis improves the network security of the system/device because in response to an indicated likelihood of an unknown and/or zero-day attack the central server takes action to immunize the network by forwarding the retrieved indicators of attack to the computing entities and network security hardware on the network. Network security hardware includes firewalls, endpoint detection and response systems, intrusion prevention systems, web application firewalls, embedded traps or any other system capable of threat prevention using indicators of attack.

In other examples analysis is performed by the central server to determine whether a cyber-attack is occurring at one specific computing entity or across the wider network. This is performed by correlating the indicators of attack from multiple cyber clones. For example, if the indicators of attack gathered by CL1 have a low correlation to the indicators of attack of CL2 it is likely the cyber-attack is targeting only CL1. Otherwise, a high correlation between indicators of attack of CL1 and CL2 indicates that the cyber-attack is being performed across the network. The real time analysis of targeted attacks on the system allows more efficient control of security measures to network locations where it is most required.

In other examples the indicators of attack are provided to the embedded trap 612. The embedded trap 612 is part of the central server as shown in FIG. 6 or is positioned at another computing entity. When an irregular request is received at a computing entity, rather than responding with an error message that could provide reconnaissance for a cyber attacker, the request is forwarded to the embedded trap 612. The embedded trap compares the request with the indications of attack received from the clones CL1, CL2. The embedded trap 612 determines whether the request is malicious from the comparison with the indications of attack and where a malicious request is determined provides a cyber clone deceptive response. Where there is no malicious intent determined the embedded trap provides the standard error response. Implementing the embedded trap 612 allows computing entities to benefit from information gathered by cyber clones.

Figure 7:
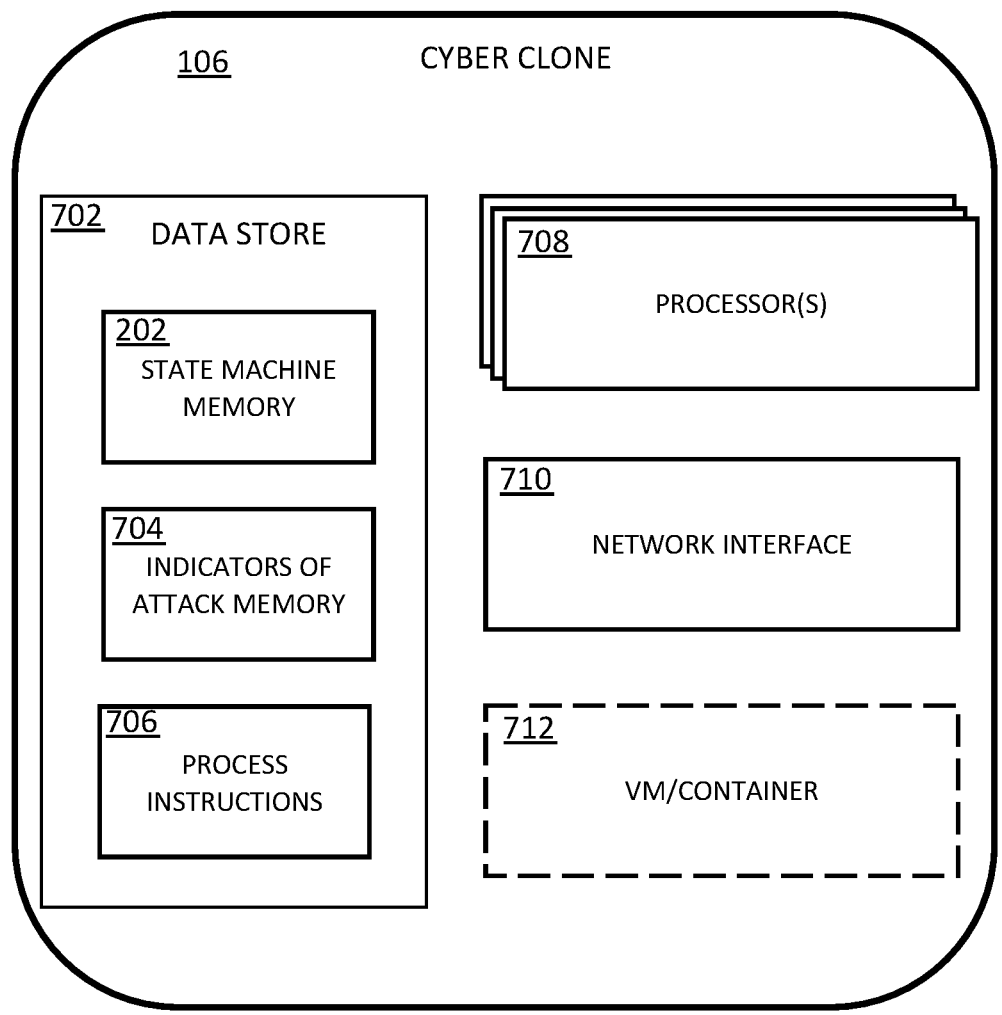
FIG. 7 is a schematic diagram of example hardware for implementing a cyber clone.

FIG. 7 illustrates various components of an example cyber clone 106 in which embodiments of FIGS. 1-5 are implemented in some examples. The cyber clone comprises one or more processors 708 which are microprocessors, controllers, or any other suitable type of processors for processing computer executable instructions to control the operation of the device to perform the methods of FIGS. 1-5. In some examples, for example where a system on a chip architecture is used, the processors 708 include one or more fixed function blocks (also referred to as accelerators) which implement a part of the method of FIGS. 1-5 in hardware (rather than software or firmware). That is, the methods described herein are implemented in any one or more of software, firmware, hardware. The computing device has a data store 702 holding a state machine memory 202, indicators of attack memory 704 and process instructions 706 for carrying out any of the methods of FIGS. 1-5. Platform software comprising an operating system or any other suitable platform software is provided at the cyber clone to enable application software to be executed on the device. Although shown as a dedicated computing device it will be appreciated that the cyber clone is, in some examples, instantiated as a virtual machine or container 712 on a shared device or server.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description, it will be evident to a person skilled in the art that various modifications may be made within the scope of the invention.

Clause A: a cyber clone of a computing entity comprising: a processor; and a memory storing instructions that when executed by the processor cause the cyber clone to: store a plurality of states, each state corresponding to a distinct operating state of the computing entity; store for each state in the plurality of states: a recorded request received at the computing entity in a corresponding operating state, and a recorded response sent from the computing entity and associated with the recorded request, receive an external request from an attacker; determine an indicator of attack from the external request; compare the external request with the recorded request for a current state of the plurality of states; in response to the external request matching the recorded request, send the associated recorded response to the attacker; in response to the external request not matching the recorded request:
provide a false, deceiving response, or forward the external request to the computing entity, receive a live response from the computing entity, forward the live response to the attacker; and update the current state to a state of the plurality of states based on the external request and the current state.

Clause B: the cyber clone according to clause A wherein the recorded response is a fixed value response.

Clause C: the cyber clone according to clause B wherein the fixed value response comprises at least one of text, a Hyper Text Transfer Protocol page, a number, and binary data.

Clause D: the cyber clone according to any of clauses A to C wherein the external request is forwarded to the computing entity via a reverse proxy connection.

Clause E: the cyber clone according to clause A wherein the recorded response is a dynamic value response.

Clause F: the cyber clone according to claim E wherein the dynamic value response comprises at least one of a temperature value, a camera view, screenshot and any other data that can be created using a programming language function.

Clause G: the cyber clone according to any preceding clause wherein the recorded response is a simulated error response.

Clause H: the cyber clone according to clause G wherein the simulated error response comprises at least one of a fake error page, a fake time out and a fake data output.

Clause I the cyber clone according to any preceding clause wherein the recorded request and the recorded response for each state of the plurality of states are recorded from observed network traffic at the computing entity.

Clause J: the cyber clone according to any of clauses A to H wherein the recorded response for each state of the plurality of states are recorded from live responses received from the computing entity in response to test requests sent by the cyber clone.

Clause K: the cyber clone according to any preceding clause wherein the stored indicators of attack are forwarded to a server.

Clause L: the cyber clone according to any preceding clause wherein the indicators of attack comprise at least one of an Internet Protocol (IP) address, a classless inter-domain routing, a Uniform Resource Locator, a domain name, a payload, a signature, a hash, a keyword, and an email address.

Clause M: the cyber clone according to any of the preceding clauses wherein the computing entity is one of an online service, a device interface, and an Internet of Things device.

Clause N: the cyber clone according to any of the preceding clauses further comprising a discoverable network interface having an IP address and not a Domain Name Service (DNS) address or a DNS address that is not findable using public search engines.

Clause O: the cyber clone according to any of the previous clauses wherein the recorded request and the recorded response for each state of the computing entity are anonymized.

Clause P: a computer-implemented method of deceiving an attacker using a cyber clone of a computing entity, the method comprising: storing a plurality of states, each state corresponding to a distinct operating state of the computing entity; storing for each state: a recorded request and its variations received at the computing entity in a corresponding operating state, and a recorded response sent from the computing entity associated with the recorded request, receiving an external request from an attacker; determining an indicator of attack from the external request; comparing the external request with the recorded request for a current state of the plurality of states; in response to the external request matching the recorded request, sending the associated recorded response to the attacker; in response to the external request not matching the recorded request: forwarding the external request to the computing entity, receiving a live response from the computing entity, forwarding the live response to the attacker; and updating the current state to a state of the plurality of states based on the external request and the current state.

Clause Q: a system comprising: a plurality of computing entities; a cyber clone for each computing entity comprising: a processor; and a memory storing instructions that when executed by the processor cause the cyber clone to: store a plurality of states, each state corresponding to a distinct operating state of the computing entity; store for each state: a recorded request received at the computing entity in a corresponding operating state, and a recorded response sent from the computing entity and associated with the recorded request, receive an external request from an attacker; determine an indicator of attack from the external request; compare the external request with the recorded request for a current state of the plurality of states; in response to the external request matching the recorded request, send the associated recorded response to the attacker; in response to the external request not matching the recorded request: forward the external request to the computing entity, receive a live response from the computing entity, forward the live response to the attacker; and update the current state to a state of the plurality of states based on the external request and the current state; and a server comprising: a server processor, and a memory storing instructions that when executed by the server processor cause the server to: receive the indicators of attack from two or more of the cyber clones; determine whether there has been a zero-day attack by correlating the received indicators of attack with historic indicators of attack.

Clause R: the system according to clause Q wherein having determined there has been a zero-day attack, the server forwards the received indicators of attack to the plurality of computing entities and/or to a firewall.

Clause S: the system according to clause Q or R wherein the server comprises an embedded trap having access to the received indicators of attack from the two or more cyber clones, and wherein the embedded trap determines whether requests are malicious or non-malicious, and in response to determining a request is malicious, determines a cyber clone deceptive response and in response to determining a request is a non-malicious request, provides a standard error response.

Clause T: the system according to any of clauses Q to S wherein the stored instructions when executed by the processor cause the server to additionally: determine whether there has been a targeted attack on a specific computing entity by correlating the indicators of attack received from two or more cyber clones.

The invention claimed is:

1. A cyber clone of a computing entity, the cyber clone comprising:
 a processor; and
 a memory storing instructions that when executed by the processor cause the cyber clone to:
  store a plurality of states, each state of the plurality of states corresponding to a distinct operating state of the computing entity;
  store for each state of the plurality of states:
   a recorded request received at the computing entity in the corresponding distinct operating state, and
   a recorded response sent from the computing entity and associated with the recorded request;
  receive an external request from an attacker;
  determine an indicator of attack from the external request;
  compare the external request with the recorded request for a current state of the plurality of states;
  in response to the external request matching the recorded request, send the associated recorded response to the attacker;
  in response to the external request not matching the recorded request:
   (i) provide a false, deceiving response, or
   (ii) forward the external request to the computing entity,
   receive a live response from the computing entity, and
   forward the live response to the attacker; and
  update the current state to a state of the plurality of states based on the external request and the current state.

2. The cyber clone according to claim 1, wherein the recorded response is a fixed value response.

3. The cyber clone according to claim 2, wherein the fixed value response comprises at least one of text, a Hyper Text Transfer Protocol page, a number, or binary data.

4. The cyber clone according to claim 3, wherein the external request is forwarded to the computing entity via a reverse proxy connection.

5. The cyber clone according to claim 1, wherein the recorded response is a dynamic value response.

6. The cyber clone according to claim 5, wherein the dynamic value response comprises at least one of a temperature value, a camera view, screenshot, or data that can be created using a programming language function.

7. The cyber clone according to claim 1, wherein the recorded response is a simulated error response.

8. The cyber clone according to claim 7, wherein the simulated error response comprises at least one of a fake error page, a fake time out, or a fake data output.

9. The cyber clone according to claim 1, wherein the recorded request and the recorded response for each state of the plurality of states are recorded from observed network traffic at the computing entity.

10. The cyber clone according to claim 1, wherein the recorded request and the recorded response for each state of the plurality of states are recorded from live responses received from the computing entity in response to test requests sent by the cyber clone.

11. The cyber clone according to claim 1, wherein the indicator of attack is forwarded to a server.

12. The cyber clone according to claim 1, wherein the indicator of attack comprises at least one of an Internet Protocol (IP) address, a classless inter-domain routing (CIDR), a Uniform Resource Locator, a domain name, a payload, a signature, a hash value, a keyword, or an email address.

13. The cyber clone according to claim 1, wherein the computing entity is one of an online service, a device interface, or an Internet of Things device.

14. The cyber clone according to claim 1, further comprising a discoverable network interface having an Internet Protocol (IP) address and not a Domain Name Service (DNS) address or a DNS address that is not findable using public search engines.

15. The cyber clone according to claim 1, wherein the recorded request and the recorded response for each state of the plurality of states are anonymized.

16. A computer-implemented method of deceiving an attacker using a cyber clone of a computing entity, the method comprising:
 storing a plurality of states, each state of the plurality of states corresponding to a distinct operating state of the computing entity;

storing for each state of the plurality of states:
- a recorded request and its variations received at the computing entity in a corresponding distinct operating state, and
- a recorded response sent from the computing entity associated with the recorded request;

receiving an external request from an attacker;

determining an indicator of attack from the external request;

comparing the external request with the recorded request for a current state of the plurality of states;

in response to the external request matching the recorded request, sending the associated recorded response to the attacker;

in response to the external request not matching the recorded request:
- (i) providing a false, deceiving response, or
- (ii) forwarding the external request to the computing entity,
- receiving a live response from the computing entity, and
- forwarding the live response to the attacker; and updating the current state to a state of the plurality of states based on the external request and the current state.

17. A system comprising:

a plurality of computing entities;

a cyber clone for each computing entity comprising:
- a processor; and
- a memory storing instructions that when executed by the processor cause the cyber clone to:
  - store a plurality of states, each state of the plurality of states corresponding to a distinct operating state of the computing entity;
  - store for each state of the plurality of states:
    - a recorded request received at the computing entity in a corresponding distinct operating state, and
    - a recorded response sent from the computing entity and associated with the recorded request;
  - receive an external request from an attacker;
  - determine an indicator of attack from the external request;
  - compare the external request with the recorded request for a current state of the plurality of states;
  - in response to the external request matching the recorded request, send the associated recorded response to the attacker;
  - in response to the external request not matching the recorded request:
    - (i) providing a false, deceiving response, or
    - (ii) forward the external request to the computing entity,
    - receive a live response from the computing entity, forward the live response to the attacker; and
  - update the current state to a state of the plurality of states based on the external request and the current state; and a server comprising:
- a server processor, and
- a memory storing instructions that when executed by the server processor cause the server to:
  - receive indicators of attack from two or more cyber clones; and
  - determine whether there has been a zero-day attack by correlating the indicators of attack with historic indicators of attack.

18. The system according to claim 17, wherein having determined there has been the zero-day attack, the server forwards the indicators of attack to the plurality of computing entities or to a firewall.

19. The system according to claim 17, wherein the server comprises an embedded trap having access to the indicators of attack from the two or more cyber clones, and wherein the embedded trap determines whether requests are malicious or non-malicious, and in response to determining a request is malicious, determines a cyber clone deceptive response and in response to determining a request is a non-malicious request, provides a standard error response.

20. The system according to claim 17, wherein the stored instructions when executed by the processor cause the server to additionally:
- determine whether there has been a targeted attack on a specific computing entity by correlating the indicators of attack received from the two or more cyber clones.

* * * * *